United States Patent [19]
Derrington

[11] Patent Number: 4,554,722
[45] Date of Patent: Nov. 26, 1985

[54] METHOD FOR REMOVING GUN BARREL EVACUATOR

[75] Inventor: Tommy J. Derrington, Denton, Tex.

[73] Assignee: Eagle-Picher Industries, Inc., Cincinnati, Ohio

[21] Appl. No.: 463,643

[22] Filed: Feb. 3, 1983

[51] Int. Cl.[4] .............................................. B23P 19/00
[52] U.S. Cl. .................................. 29/426.5; 29/426.1; 29/275; 29/277
[58] Field of Search ................. 29/426.6, 426.5, 426.4, 29/280, 275, 276, 277, 282, 229, 426.1; 24/462, 16 R; 81/463; 89/14 B, 14 C, 14 D, 14 E; 173/128

[56] References Cited

U.S. PATENT DOCUMENTS

| | | | |
|---|---|---|---|
| 3,651,544 | 3/1972 | Soma | 24/16 R |
| 3,858,704 | 6/1971 | Schroeder | 29/282 X |
| 4,242,775 | 1/1981 | Eickmann | 24/16 R |
| 4,260,357 | 4/1981 | Roast et al. | 29/229 X |

*Primary Examiner*—Howard N. Goldberg
*Assistant Examiner*—John T. Burtch
*Attorney, Agent, or Firm*—Wood, Herron & Evans

[57] ABSTRACT

A resilient plastic ring having a sector removed. The ring is adapted to be snapped transversely onto a gun barrel adjacent a bore evacuator. When in place, the ring can be struck with a hammer to cause the evacuator to slide axially off the gun barrel.

1 Claim, 3 Drawing Figures

METHOD FOR REMOVING GUN BARREL EVACUATOR

This invention relates to an article for assisting in the removal of a gun barrel evacuator.

The M-48, M-60 and M-1 series of main combat battle tanks have a 105 mm main gun. At about the middle of the gun barrel is an evacuator which is in the shape of a cylindrical, hollow cannister. It is slid on the tapered barrel over a threaded portion of the barrel and is secured in place by a retaining ring threaded onto the barrel. The evacuator functions to suck smoke out of the barrel when a round is fired.

After a day at the firing range, the evacuator must be removed from the gun barrel for cleaning and lubrication. Current instructions from the Army Manual require two soldiers to cooperate in the removal of the evacuator. One soldier holds a 2×4 against one end of the evacuator and the other soldier swings a sledge hammer against the 2×4 to break the evacuator loose from the barrel so that it can be slid off. There are obvious disadvantages to this procedure. It is a two-man operation where obviously it would be preferable to have a one-man operation. There is a good possibility of injury to the hands of the soldier holding the 2×4 against the evacuator. There is a good possibility of damage to the evacuator itself arising out of a badly-aimed swing of the sledge hammer or the splintering of the 2×4 when struck by the sledge hammer.

It has been an objective of the present invention to provide an improved method of removing the evacuator as well as an improved article to assist in the removal of the evacuator. This objective of the invention is attained by providing a polyurethane ring having approximately a 90° sector removed so that the ring can be snapped transversely over the gun barrel and slid snugly against the end of the evacuator. The thus formed ring will stay in position permitting one soldier using a sledge hammer to break the evacuator loose from the gun barrel so that it may be slid off. The ring can be used to replace the evacuator by reversing its position with respect to the evacuator. With the ring in place, the evacuator can be tapped snugly into position against the taper of the gun barrel and past the threads on the gun barrel which receive the retaining ring. The ring will prevent any inadvertent damage to those threads during the replacement of the evacuator.

The ring is preferably of a polyurethane material having a 95A durometer. That material has the strength to withstand repeated hammering and has the resilience to permit it to be snapped over the gun barrel where it is frictionally retained in position when the evacuator is hammered loose.

BRIEF DESCRIPTION OF THE DRAWINGS

The several features of the invention will become more readily apparent from the following detailed description taken in conjunction with the accompanying drawings in which.

While in this description reference has been made to the 105 mm gun, it should be understood that the invention is applicable to other guns employing evacuators such as the 155 mm self-propelled howitzer.

Figure 1:
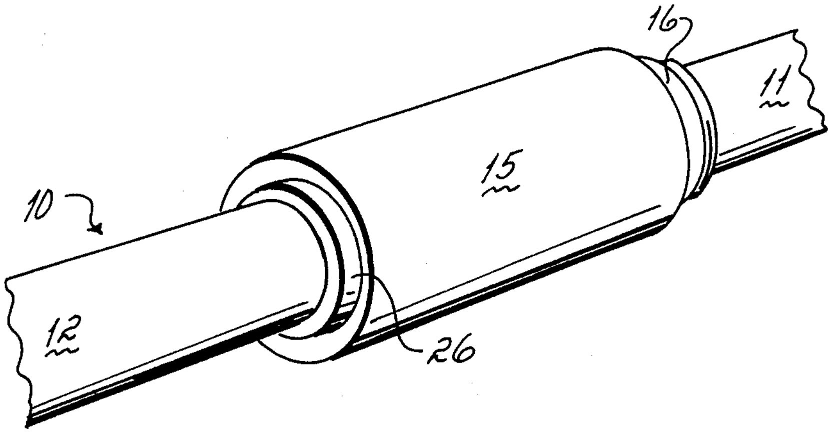
FIG. 1 is a fragmentary perspective view of the gun barrel having an evacuator and the article of the present invention mounted on the gun barrel.
Figure 2:
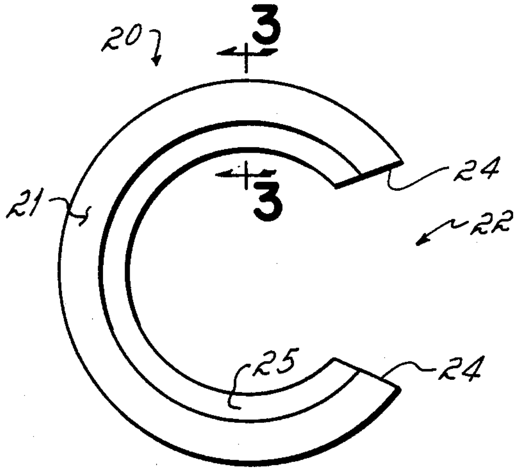
FIG. 2 is an elevational view of the article.
Figure 3:
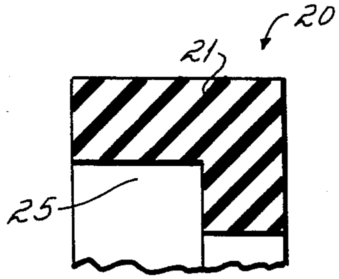
FIG. 3 is a cross-sectional view taken along lines 3—3 of FIG. 2.

Referring to FIG. 1, there is shown a tapered gun barrel 10 having a muzzle end 11 and a breech end 12. The gun barrel is tapered from the breech end toward the muzzle end. An evacuator 15 which is in the shape of a cylindrical cannister is slid from the muzzle end of the barrel to a location intermediate the ends of the barrel where it is blocked from further movement toward the breech by the taper of the barrel. The barrel has threads to which a retaining ring 16 is applied to secure the evacuator on the barrel.

The evacuator must be removed after each day's firing. To do so, the retaining ring 16 is turned with a spanner wrench in a counterclockwise direction until it rides off the threads on the gun barrel. Thereafter, the evacuator must be knocked off of the gun barrel in some fashion.

In accordance with the present invention, a removal device or ring 20 is formed of a polyurethane, preferably with a durometer of about 95A. The device is in the form of a partial ring 21 having a sector at 22 removed so that the partial ring extends through an arc of about 270°. The partial ring presents end surfaces 24 which create a flared opening having a minimum dimension of 4.65 inches. The diameter of the gun barrel at the breech end of the evacuator is approximately 6¼ inches. The inside diameter of the ring is also approximately 6¼ inches in diameter so that the ring can fit snugly about the gun barrel adjacent the evacuator.

The ring 20 has a recess 25 which is adapted to receive an annular projection 26 on the evacuator when the ring is in place on the gun barrel.

The polyurethane is sufficiently flexible and resilient to spread apart as the ring is slid transversely over the gun barrel. After being slid over the gun barrel, the ring closes on the gun barrel where it will remain without being hand-held. In that position, a soldier can rap the ring with a sledge hammer to break the evacuator loose from the gun barrel so that it can be slid off the gun barrel.

It can be appreciated that the ring can also be used for installing the bore evacuator. In installing the evacuator, the evacuator is slid down the gun barrel with the ring mounted on the muzzle end of the evacuator. When approximately in position, it can be tapped slightly with a sledge hammer, thereby firmly seating it in position. Thereafter, the device is removed and the retaining ring applied to the threads adjacent the muzzle end of the device.

It can be appreciated that the device has many advantages.

It reduces the personnel required by allowing one man to remove or install the bore evacuator easily. It reduces possible damage to the bore evacuator from hammering. It reduces possible damage to the threads on the main gun from misalignment. It reduces the possible injury from personnel from splintering pieces of wood or soft metal, and from hammer striking hands and arms while trying to hold wood blocks in place. It will work effectively in all weather climates from desert heat to arctic cold. Constructed of polyurethane, it is very durable and long-lasting as well as being light in weight and thus easily carried in the tool bag or storage boxes in the tank.

Having described my invention, I claim:

1. The method of removing an evacuator from a gun barrel comprising the steps of, transversely snapping a resilient plastic ring, having approximately a 90° sector removed, on said gun barrel adjacent the breech side of said evacuator, said ring having an annular recess and said evacuator having an annular projection mounted on the breech side thereof, sliding said ring snugly against said evacuator so that said recess mates with said projection, and striking said ring with axial blows to cause said evacuator to slide off said gun barrel.

* * * * *